United States Patent Office 2,796,433
Patented June 18, 1957

2,796,433
PROCESS FOR PRODUCING GLUTAMIC ACID

Joseph L. Purvis, Northbrook, and Harold L. Fike, Chicago, Ill., assignors to International Minerals & Chemical Corporation, a corporation of New York No Drawing. Application August 27, 1954,
Serial No. 452,738

12 Claims. (Cl. 260—527)

This invention relates to a process for the recovery of glutamic acid from glutamic acid mother substances and, more particularly, to a process for the recovery of glutamic acid from concentrated Steffen's filtrate and proteinaceous materials.

Glutamic acid is produced by hydrolysis of vegetable proteins and sugar beet waste liquors, separation of impurities from the resulting hydrolyzates and crystallization of glutamic acid at its isoelectric point. In the recovery of glutamic acid from such hydrolyzates, substantial quantities of glutamic acid fail to crystallize and are lost in the end liquor which is discarded. The most successful method of reducing losses of glutamic acid has been to reduce the quantity of end liquor to a minimum by concentrating the solutions from which glutamic acid is to be crystallized to the highest possible degree. Under typical and customary conditions, the quantity of glutamic acid lost in the end liquor is ordinarily between about 25% and about 40% of that originally present in the hydrolyzate. The degree to which concentration can be carried is limited because of organic material present in the hydrolyzate, and beyond a certain point the liquor becomes too viscous and thick to permit further processing.

Ion exchange treatments have been utilized as a possible method for recovering glutamic acid from the end liquor and have to a certain extent been successful. The cost of such processes, however, has been too high for commercial practice and in some instances the glutamic acid recovered was highly contaminated with impurities.

It is an object of the present invention to provide an improved process for the recovery of increased yields of glutamic acid from raw materials containing glutamic acid mother substances.

It is a further object of the instant invention to provide a commercially feasible process for the recovery of increased yields of glutamic acid from concentrated Steffen's filtrate.

Another object of the instant invention is to provide a commercially feasible process for the recovery of increased yields of glutamic acid from proteinaceous materials.

A further object of the instant invention is to provide a process for the recovery of glutamic acid from glutamic acid mother substances with substantially less loss of glutamic acid in the end liquor as compared with glutamic acid recovery processes utilized in the past.

Another object of the instant invention is to provide a process for recovering glutamic acid values from glutamic acid mother substances whereby contaminating materials are removed during the process, thereby permitting greater concentration of the glutamic acid solution prior to crystallization.

In accordance with this invention, an aqueous solution which is to be processed for the recovery of glutamic acid is defecated by precipitating contaminating organic material from the solution as barium salts, the pH of the solution being greater than about 7 and the solids content of the solution being at least 25% by weight. The invention is applicable to any aqueous solution containing glutamic acid or glutamic acid precursor compounds (mother substances, such as glutamine or pyrrolidone carboxylic acid).

More particularly, this invention is carried out by treating concentrated Steffen's filtrate, or a hydrolyzate formed by hydrolysis of a mother substance capable of yielding glutamic acid upon hydrolysis, with a water soluble barium salt under certain prescribed conditions, whereby contaminating organic materials present in the solution being treated are precipitated as barium salts. Removal of these organic materials permits concentration of the aqueous solution to a considerably greater extent prior to recovery of glutamic acid therefrom and, thereby, permits recovery of glutamic acid in higher yields and affords less loss of glutamic acid in the end liquors.

In accordance with one embodiment of this invention, Steffen's filtrate having a solids content of at least 25% by weight, and preferably at least 40% by weight, and having a pH greater than about 7, and preferably between about 9 and about 11, is treated with a water soluble barium salt, for example, barium chloride. The barium ions from the water soluble barium salt react with contaminating organic material in the concentrated Steffen's filtrate and precipitate them as barium salts. The precipitate may be separated by any convenient means, such as by filtration, and the Steffen's filtrate free from this contaminating organic material may then be hydrolyzed and further processed according to conventional methods for the recovery of glutamic acid.

According to another embodiment of this invention, a concentrated Steffen's filtrate hydrolyzate obtained by hydrolysis of concentrated Steffen's filtrate by conventional procedures with either an acid or an alkali is adjusted, if necessary, to a pH greater than about 7, and preferably to a pH between about 9 and about 11, by the addition of an inorganic acid or alkali depending upon whether the hydrolysis was an alkaline or an acid hydrolysis. The adjusted hydrolyzate, if it has a solids concentration of at least 25% by weight, may then be treated directly with a water soluble barium salt. If the adjusted hydrolyzate has a lower solids content, it is concentrated by evaporation of water until the solids concentration of the hydrolyzate is at least 25% by weight, and preferably at least 40% by weight. In the case of an alkaline concentrated Steffen's filtrate hydrolyzate, that is, a hydrolyzate produced by hydrolysis of concentrated Steffen's filtrate with an alkali, such as sodium hydroxide, the hydrolyzate may be treated directly with a water soluble barium compound to precipitate contaminating organic materials. Desirably, however, in the case of an alkaline Steffen's filtrate hydrolyzate, the pH of the hydrolyzate will be adjusted to between about 9 and about 11 by the addition of an inorganic acid, such as hydrochloric acid, although any pH above about 7 is satisfactory. Ordinarily, an alkaline Steffen's filtrate hydrolyzate with or without adjustment of the pH will have a solids content of at least 25% and usually above 40% and no concentration step will be necessary. With a dilute Steffen's filtrate, however, a concentration of the solution may be required.

It is a preferred procedure in carrying out this invention to adjust the pH of the aqueous solution which is to be processed for the recovery of glutamic acid to a value greater than about 7 and to concentrate the aqueous solution to a solids content of at least 25% by weight prior to addition of the water-soluble barium salt. An alternative procedure, however, is to add the water soluble barium salt to the aqueous solution having a lower pH or having a solids content of less than about 25% by weight or both, and then following addition of the water soluble barium salt, adjusting the pH to a value greater than about 7 or the solids content to greater than 25% by weight or both, if necessary, to bring these values within the requirements of this invention. When the water soluble barium salt is added to the aqueous solution having a pH of less than about 7 or a solids content of less than about 25% by weight, precipitation of the contaminating organic material present is incomplete and full advantage of the present invention may be attained only by adjusting the pH and/or solids content as necessary to at least the minimum values called for in this invention as described.

The process of this invention may be applied to aqueous solutions containing glutamic acid or glutamic acid precursor compounds at any stage in any conventional process for recovering glutamic acid from such solutions and the full advantage of the invention will be attained so long as the pH of the aqueous solution is greater than about 7 and the solids content of the solution is at least 25% by weight at the time of precipitation of the contaminating organic material. Addition of the water soluble barium salt, preferably barium chloride, under these conditions results in the formation of barium salts of the contaminating organic material, which barium salts precipitate and may be removed by any convenient means as, for example, by filtration or centrifuging. The filtrate may be treated by any conventional process for the recovery of glutamic acid.

According to another embodiment of this invention, a proteinaceous material, such as wheat gluten, corn gluten, or the like, is hydrolyzed with an inorganic acid, such as hydrochloric acid. The hydrolyzate is treated with an inorganic alkali, such as sodium hydroxide, to adjust the pH to greater than about 7. The adjusted hydrolyzate is concentrated until it has a solids content of at least 25% by weight, and preferably at least about 40% by weight, and a water soluble barium salt such as barium chloride is added. The barium ions react with contaminating organic compounds in the aqueous hydrolyzate solution forming barium salts of the organic materials which precipitate. The precipitate may be separated by conventional means, as for example by filtration. If the precipitate is washed, the washings must not be added to the filtrate. To do so would again contaminate the solutions with substantial amounts of undesirable organic material.

A particular embodiment of this invention involves hydrolyzing a proteinaceous material such as corn gluten with an inorganic acid such as hydrochloric acid or sulfuric acid, adjusting the pH of the hydrolyzate with an alkali such as sodium hydroxide or ammonia to between about 5 and about 7, separating humin from the adjusted hydrolyzate by filtration, concentrating the filtrate to a solids content of greater than about 25% by evaporating water, separating insoluble material (mostly tyrosine and leucine) which precipitates during the concentration step, adding an alkali such as sodium hydroxide or ammonia to adjust the pH of the filtrate to greater than about 7 and preferably to between about 9 and about 11, adding a water soluble barium salt to the adjusted aqueous solution to precipitate as barium salts, contaminating organic materials which are present, separating the barium precipitate by filtration, and recovering glutamic acid from the filtrate.

The barium salts utilized in this invention may be any water soluble inorganic barium salts. Barium chloride is particularly preferred, but barium hydroxide and barium carbonate may also be utilized. In using barium carbonate, it is preferred to add the barium carbonate to the aqueous solution containing glutamic acid or glutamic acid precursor compounds while the solution is acidic and then adjusting the pH of the solution to greater than about 7 by addition of alkali, such as sodium hydroxide.

An embodiment of this invention, which is particularly useful in permitting ultimate recovery of glutamic acid from an aqueous solution containing glutamic acid or glutamic acid precursor compounds in high yields with a minimum quantity of reagents, involves alkaline hydrolysis of concentrated Steffen's filtrate using barium hydroxide as the hydrolyzing agent. The hydrolyzate produced contains a precipitate comprising barium salts of contaminating organic materials which may be removed by filtration. Alternatively, the hydrolyzate may be treated with gaseous carbon dioxide to adjust the pH to about 9.0. The excess barium ions will be precipitated as barium carbonate and the barium carbonate and barium salts of contaminating organic compounds present in the hydrolyzate may be removed simultaneously by filtration. In carrying out this embodiment of the invention, it is necessary that any wash waters obtained by washing the barium carbonate filter cake be kept free from the filtrate. Washing the barium carbonate filter cake will solubilize substantial quantities of the barium salts of contaminating organic compounds contained therein, and the addition of such washings to the filtrate liquor containing glutamic acid will reduce the amount of glutamic acid ultimately recovered from this solution in accordance with the process of this invention unless subsequently precipitated by a water soluble barium salt as described herein. It is desirable that any wash waters obtained by washing a precipitate containing the contaminating organic material which it is desired to remove in accordance with this invention be set aside to be combined with a separate batch of concentrated Steffen's filtrate to be treated subsequently. In the past, concentrated Steffen's filtrate has been hydrolyzed with barium hydroxide but the advantages of the present invention have never been attained either for the reason that the solution was not sufficiently concentrated, the pH of the solution was too low (i. e., below about 7) at the point of separation of the barium salts, or, and this was usually the case, the barium ions were precipitated as inorganic salts and the wash waters obtained by washing the precipitate were added to the filtrate solution to be processed for the recovery of glutamic acid. Washing the precipitate would redissolve any contaminating organic compounds which had been precipitated and the inclusion of such wash waters in the filtrate would again contaminate the glutamic acid containing solution. Consequently, it is important in carrying out this invention that upon precipitation of the barium salts of the contaminating organic compounds that the precipitate either be not washed at all, or if washed, the wash waters should be recycled to a prior step in the process, so that they may be again treated with a water soluble barium salt to precipitate the contaminating organic compounds as barium salts.

The following examples illustrate specific embodiments of this invention. All parts and percentages are by weight unless otherwise indicated.

*Example 1*

Concentrated Steffen's filtrate in the amount of about 1000 parts was hydrolyzed by adding about 162.5 parts of a 50% aqueous sodium hydroxide solution and heating the alkaline mixture for about 2.25 hours at about 88° C. The hydrolyzate was adjusted to about pH 9.0 by addition of concentrated hydrochloric acid (37%). About 100 parts of $BaCl_2 \cdot 2H_2O$ in the form of a 20% aqueous solution was added to the adjusted hydrolyzate which had a solids content of about 52%. A precipitate comprising a barium salt of organic material formed immediately on the addition of the aqueous barium chloride solution and was removed by filtration. The filter cake was not washed. Excess barium ions were removed from the filtrate by adding sodium carbonate in an amount sufficient to precipitate all of the barium ions as barium carbonate. The barium carbonate precipitate was removed by filtration, thoroughly washed with water, and the washings added to the filtrate. The filtrate was adjusted to about pH 5.0 with concentrated hydrochloric acid and then concentrated by evaporation of water until the viscosity amounted to about 375 centipoises (80° C.). The concentrated solution was then filtered to remove inorganic salts comprising sodium chloride and potassium chloride which crystallized during the concentration of the solution. Following removal of the inorganic salts, the filtrate was adjusted to about pH 3.2 with concentrated hydrochloric acid and allowed to stand at room temperature with occasional agitation for five days to permit crystallization of glutamic acid. The crystallized glutamic acid was removed by filtration. The mother liquor (end liquor) remaining following removal of crystallized glutamic acid amounted to about 512 parts and contained 7.8 parts of glutamic acid. The yield of glutamic acid amounted to about 80% of the glutamic acid value in the starting material.

Example II

Following the procedure of Example I and utilizing an equivalent raw material and the same reagents, but omitting the precipitation of contaminating organic compounds as barium salts an end liquor was obtained which amounted to 700 parts and contained 14 parts of glutamic acid. The yield of glutamic acid amounted to about 72% based on the glutamic acid values in the starting material.

Example III

Corn gluten in the amount of about 500 parts and containing about 64% protein, 5.9% moisture, 15.1% glutamic acid values in the form of its precursors was hydrolyzed by refluxing with about 1000 parts of 26% aqueous hydrochloric acid for 16 hours. The hydrolyzate was adjusted to about pH 6.2 by addition of about 625 parts of a 50% aqueous sodium hydroxide solution. The temperature was maintained below 50° C. by cooling the reaction vessel. The adjusted hydrolyzate was filtered to remove humin which was formed during the hydrolysis. The humin was washed with six 100 part portions of a 5% aqueous sodium chloride solution and the washings were added to the filtrate. The filtrate with combined washings was concentrated to about 1200 parts and filtered at about 50° C. to remove inorganic compounds which separated during the concentration of the filtrate. The filter cake was washed with one 50 part portion of water and then with one 25 part portion of water. The filtrate and combined washings amounting to about 859 parts and having a solids content of about 50% were adjusted to about pH 9.0 by addition of about 63.4 parts of a 50% aqueous sodium hydroxide solution. Then about 100 parts of $BaCl_2 \cdot 2H_2O$ was added slowly in the form of a 20% aqueous solution. A precipitate comprising barium salts of contaminating organic compounds formed immediately and was removed on a precoated filter and pressed as dry as possible. The filter cake was not washed. Excess barium ions were removed from the filtrate by addition of sodium carbonate in an amount sufficient to precipitate all of the barium ions as barium carbonate. The barium carbonate was removed by filtration, washed thoroughly with water and the washings added to the filtrate. The filtrate with combined washings was adjusted to about pH 6.0 by addition of about 52.9 parts of concentrated hydrochloric acid (37%) concentrated to about 776 parts by evaporation of water and again filtered at about 50° C. The filter cake was washed with one 25 part portion of water and another 15 part portion of water and the washings added to the filtrate. The filtrate and combined washings amounting to about 676 parts was concentrated to 500 parts by evaporation of water, cooled to room temperature and adjusted to about pH 3.2 by addition of about 112.8 parts of concentrated hydrochloric acid (37%). The adjusted solution was then allowed to stand for 5 days with occasional stirring to permit crystallization of glutamic acid. The crystallized glutamic acid was removed by filtration, leaving an end liquor amounting to about 332 parts containing about 7.48 parts of glutamic acid. The recovered crude glutamic acid contained 83% of the glutamic acid values in the starting material.

Example IV

Following the procedure of Example III and utilizing equivalent raw material and reagents, but omitting the removal of contaminating organic compounds as barium salts, there was obtained an end liquor in an amount of about 500 parts and containing about 12.5 parts of glutamic acid. Thus, the defecation procedure of Example III resulted in reducing the loss of glutamic acid in the end liquor by about 40%. The yield of glutamic acid amounted to about 74% based on the glutamic acid values in the starting material.

Example V

Concentrated Steffen's filtrate having a solids content of about 58% in the amount of about 1000 parts was hydrolyzed by heating with about 420 parts of a 50% aqueous barium hydroxide solution for about 2½ hours at 88° C. The resulting hydrolyzate was adjusted to about pH 9.0 by treating with gaseous carbon dioxide. Excess barium ions in the solution were thereby precipitated as barium carbonate. The insoluble barium salts comprising barium carbonate and barium salts of contaminating organic material were removed by filtration and washed with two 600 part portions of warm water (60° C.). The washings were discarded. In a continuous process or in a commercial batch process, the washings would be recycled back in the process, that is, added to a portion of concentrated Steffen's filtrate or concentrated Steffen's filtrate hydrolyzate which was yet to be treated for removal of contaminating organic material. The primary filtrate to which the wash water was not added was adjusted to about pH 4.5 by addition of about 85 parts of a 50% aqueous solution of sulfuric acid. The adjusted filtrate was concentrated in vacuo to about 500 parts and the potassium and sodium sulfates which precipitated during the concentration step were removed by filtration at about 80° C. The resulting filtrate was adjusted to about pH 3.2 by addition of about 85 parts of a 50% aqueous sulfuric acid solution, cooled to room temperature, and allowed to crystallize for about 5 days. The glutamic acid crystals were removed by filtration. The remaining end liquor amounted to 500 parts which was only about 70% of that resulting from standard alkaline processes for the recovery of glutamic acid from the concentrated Steffen's filtrate. The glutamic acid in the end liquor amounted to 6.5 parts which corresponded to a loss of glutamic acid in the end liquor which was about 60% lower than losses of glutamic acid utilizing standard procedures for recovering glutamic acid from concentrated Steffen's filtrate. The yield of glutamic acid amounted to about 82% of the glutamic acid values in the starting material.

Having thus fully described and illustrated the character of the invention, what is desired to be secured and claimed by Letters Patent is:

1. A method for removing organic impurities from a crude aqueous solution selected from the group consisting of protein hydrolyzates, sugar beet waste liquors, and hydrolyzates of sugar beet waste liquors, said solution containing at least one compound of the group consisting of glutamic acid and glutamic acid precursor compounds, which comprises adding a water-soluble barium compound to said crude aqueous solution and separating a solid phase therefrom at a pH greater than about 7 and a dissolved solids content of at least about 25% by weight, said solid phase comprising said organic impurities in combination with barium.

2. A method as in claim 1 for removing organic impurities from a protein hydrolyzate.

3. A method as in claim 1 for removing organic impurities from a sugar beet waste liquor.

4. The method of claim 3 wherein said sugar beet waste liquor is a concentrated Steffen's filtrate containing more than about 25% by weight of dissolved solids.

5. In a process for producing glutamic acid by hydrolysis of glutamic acid mother substances in a material of the group consisting of proteins and sugar beet waste liquors, separating impurities from the resulting hydrolyzate, and crystallizing glutamic acid at its isoelectric point from the purified hydrolyzate, the improvement which comprises adding a water-soluble barium compound to the crude hydrolyzate, separating a precipitate therefrom at a pH greater than about 7 and a dissolved solids content of at least about 25% by weight, said precipitate comprising organic impurities in combination with barium, and excluding the water-soluble components of said precipitate from the process stream in the succeeding steps of the process, whereby the quantity of end liquor is diminished and the yield of glutamic acid is increased.

6. A process as in claim 5 for producing glutamic acid from a concentrated Steffen's filtrate.

7. A process as in claim 5 wherein said precipitate is separated from said hydrolyzate at a pH between about 9 and about 11.

8. A process as in claim 5 wherein said precipitate is separated from said hydrolyzate at a dissolved solids content of at least about 40% by weight.

9. A process as in claim 5 wherein said water-soluble barium compound is barium chloride.

10. A process as in claim 5 wherein said precipitate is washed with water and the wash liquor is recycled to a point in the process prior to the addition of said water-soluble barium compound.

11. In a process for producing glutamic acid by alkaline hydrolysis of a Steffen's filtrate, separating impurities from the resulting hydrolyzate, and crystallizing glutamic acid at its isoelectric point from the purified hydrolyzate, the improvement which comprises adjusting the pH of the crude hydrolyzate to between about 9 and about 11, adding thereto a water-soluble barium compound at a dissolved solids content above about 40% by weight, separating a precipitate therefrom comprising organic impurities in combination with barium, and excluding the water-soluble components of said precipitate from the process stream in the succeeding steps of the process, whereby the quantity of end liquor is diminished and the yield of glutamic acid is increased.

12. In a process for producing glutamic acid by alkaline hydrolysis of a Steffen's filtrate, separating impurities from the resulting hydrolyzate, and crystallizing glutamic acid at its isoelectric point from the purified hydrolyzate, the improvement which comprises effecting said hydrolysis with barium hydroxide at a dissolved solids content of at least about 25% by weight, separating precipitated solids from the hydrolyzate at a pH greater than about 7, said solids comprising organic impurities in combination with barium, and excluding the water-soluble components of said solids from the process stream in the succeeding steps of the process, whereby the quantity of end liquor is diminished and the yield of glutamic acid is increased.

References Cited in the file of this patent

UNITED STATES PATENTS

| | | |
|---|---|---|
| 2,373,342 | Royal | Apr. 10, 1945 |
| 2,517,601 | Shafor et al. | Aug. 8, 1950 |
| 2,598,341 | Blish | May 27, 1952 |
| 2,706,737 | Cardinal | Apr. 19, 1955 |